United States Patent [19]

Carson

[11] 4,004,606

[45] Jan. 25, 1977

[54] FLUSH VALVE

[76] Inventor: Earl W. Carson, 287 Hazard Ave., Enfield, Conn. 06082

[22] Filed: Oct. 9, 1975

[21] Appl. No.: 621,068

Related U.S. Application Data

[63] Continuation-in-part of Ser. No. 487,711, July 11, 1974, Pat. No. 3,918,676.

[52] U.S. Cl. .............................. 137/271; 251/51; 222/477
[51] Int. Cl.² ................. F16K 21/06; F16K 31/12
[58] Field of Search ................. 251/51, 52, 54, 55; 137/525, 514.5, 269, 513.5, 271; 222/477, 17

[56] References Cited

UNITED STATES PATENTS

| 26,645 | 1/1860 | Boyle | 251/51 |
| 57,526 | 8/1866 | Loudon | 251/51 |
| 710,959 | 10/1902 | Engelhard | 251/52 |
| 1,327,000 | 1/1920 | Watrous | 251/51 |
| 2,710,736 | 6/1955 | Miller | 251/51 |
| 2,931,615 | 4/1960 | Campbell | 251/54 X |
| 3,451,422 | 6/1969 | Chorkey | 137/525 |
| 3,632,043 | 1/1972 | Kirschmann | 137/525 X |
| 3,742,970 | 7/1973 | Gross | 137/514.5 |

Primary Examiner—Arnold Rosenthal

[57] ABSTRACT

A reversible flush valve is presented which may be manually actuated and is self-closing. The valve has a spool valve element, one end of which controls communication between a fluid inlet and a fluid outlet, and the other end of which defines a control chamber. A plug movable between two positions determines the mode or direction of operation of the valve. A passageway through the spool communicates with the control chamber via a flexible valve in the form of a resilient and compressible rubber ring which controls the rate of closing of the valve.

9 Claims, 4 Drawing Figures

FLUSH VALVE

CROSS REFERENCE TO RELATED APPLICATION

This application is a continuation-in-part of my application Ser. No. 487,711, filed July 11, 1974 now U.S. Pat. No. 3,918,676.

BACKGROUND OF THE INVENTION

This invention relates to the field of the fluid flow control valves. More particularly, this invention relates to the field of reversible valves which close automatically after the delivery of a predetermined volume of liquid.

While not limited thereto in its utility, the present invention is particularly suitable and will be described in terms of a flush valve for water closets. However, it will be noted and understood that the valve of the present invention is suitable for a wide range of applications in which there is a need for a valve which automatically closes after being actuated to supply a predetermined amount of liquid from a reservoir to a discharge passage; particularly a valve in which flow can be reversed to make it suitable for other uses.

The standard water closet flush valve in use in the United States at the present time has remained essentially unchanged for many years. This standard prior art flush valve involves a cumbersome linkage arrangement, is noisy and is susceptible to leakage. The valve of the present invention eliminates or reduces these disadvantages of the prior art, and presents a flush valve of simple reliable construction. The reversible feature of the present valve also makes it versatile in that it can be installed in a variety of positions and adapted for a variety of uses.

SUMMARY OF THE INVENTION

The flush valve of the present invention is manually actuated and self-closing. The valve is reversible by means of a movable plug so that the direction of flow through the valve can be reversed. The valve is constructed in the form of a spool valve with enlarged ends serving as pistons housed in separate chambers. One of the pistons controls communication between the inlet and the outlet regardless of the direction of flow thru the valve, and movement of the spool results in communication between the inlet and the outlet to provide the necessary water for flushing or whatever other purpose is to be served. The inlet water also passes through a central passageway in the spool and through an orifice at the end of the spool on an extension which projects into a control chamber defined by the other piston. A resilient and compressible ring cooperates with the projection, and the ring compresses under the pressure of water in the central passageway to permit water to flow from the orifice into the control chamber. As the water fills the chamber, the pressure on the ring equalizes and the ring then expands to its normal state to terminate flow into the control chamber. A force differential on the pistons and a spring combine to move the spool to reclose the valve, and in so doing encounters the resistance of the fluid in the control chamber. A bleed hole is provided through the compressible rubber ring communicating with the orifice and central passageway to permit bleeding of the fluid from the control chamber at a controlled rate so as to permit a controlled closing of the valve.

The spool valve element of the valve of the present invention is directly actuated by an actuation handle which is in the form of a manually operated plunger which extends from the spool valve element. The one piece spool valve and the manually actuated plunger is the only moving element in the valve (other than the rubber ring and the spring, both of which flex), and this movable element moves only in a straight line. Accordingly, the rather elaborate and lengthy linkage mechanisms of present standard flush valves are eliminated. Furthermore, the positive closing action on the spool valve and the sealing capabilities of the spool valve minimize the problem of leakage.

Accordingly, one object of the present invention is to provide a novel and improved automatically closing valve.

Another object of the present invention is to provide a novel and improved valve in which the direction of flow thru the valve can be reversed by a movable plug.

Another object of the present invention is to provide a novel and improved flush valve, particularly for use with water closets.

Another object of the present invention is to provide a novel and improved flush valve which incorporates a spool valve mechanism as the operating valve mechanism.

Still another object of the present invention is to provide a novel and improved automatically closing valve in which the closing of the valve is controlled by the cooperative action of a flexible and compressible ring and a chamber defined by part of the valve.

Other objects and advantages of the present invention will be apparent to and understood by those skilled in the art from the following detailed description and drawings.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
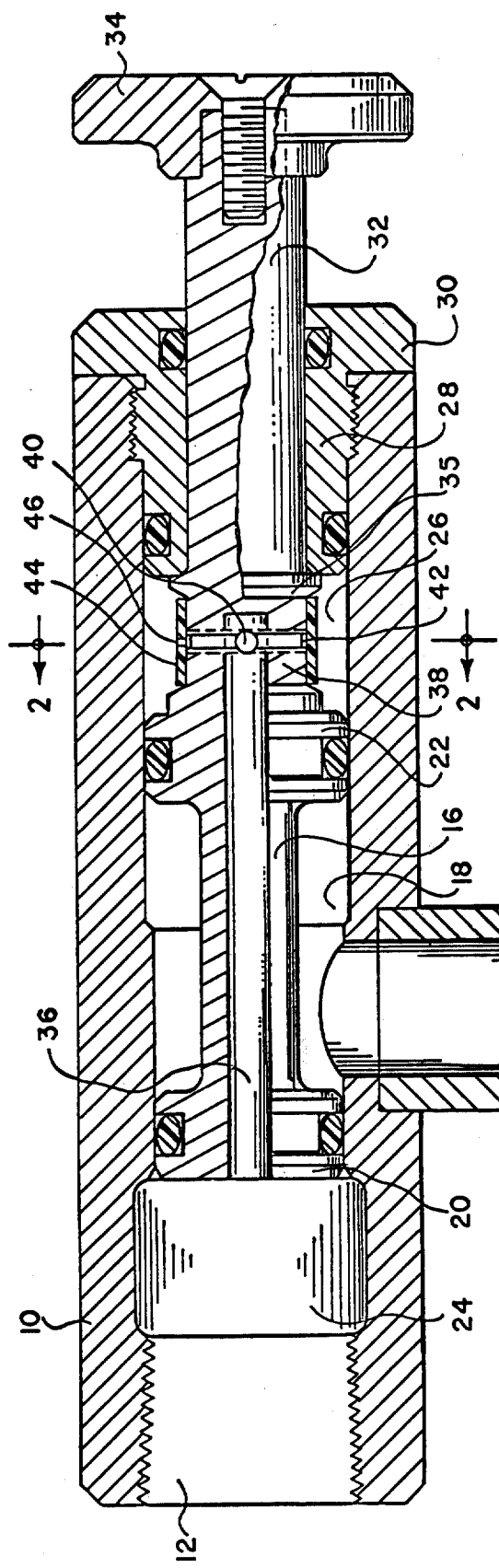
FIG. 1 is a cross-sectional elevation view of the valve as presented in my application Ser. No. 487,711 now U.S. Pat. No. 3,918,676.

Referring now to FIG. 1, the flush valve of my application Ser. No. 487,711 is shown in a side elevation view. The valve has a body 10 which has an inlet 12 and an outlet 14 for the passage of water or other fluid. A spool valve element 16 is housed in the hollow interior 18 of the valve body. The spool valve has a primary piston 20 at the left end thereof and a secondary piston 22 at the right end thereof. A supply chamber 24 is positioned adjacent inlet 12 and abuts the left end of piston 20 in the position shown in FIG. 1. A control chamber 26 is defined between secondary piston 22 and a boss 28 which extends into the hollow interior of the valve from an end closure 30, the boss 28 being threadably engaged to the interior of the valve housing. An integral slidable plunger 32 extends from spool valve element 16 and is mounted for sliding movement in boss 28. A handle 34 is mounted on part of plunger 32 projecting beyond the valve housing for manual actuation of the flush valve.

A central passageway 36 extends through spool valve 16. The left end of passageway 36 communicates with supply chamber 24. On the right end of the spool valve, central passageway 36 extends into a spool extension 38 which projects into control chamber 26. One or more flow orifices (see also FIG. 2) extend radially outwardly from the central of extension 38, the flow orifices communicating with central passageway 36. The flow orifices 40 terminate in an annular groove 42 at the outer surface of extension 38. A resilient annular rubber sleeve 44 is mounted on the outer surface of extension 38, and sleeve 44 has a bleed orifice 46 whereby orifices 40 in groove 42 can communicate with control chamber 26.

In the position shown in FIG. 1, the valve is in the closed position whereby inlet 12 is sealed from outlet 14 by primary piston 20. In this closed position of the valve resilient rubber sleeve 44 is in a contracted state and firmly engages the outer surface of extension 38. Supply fluid is present at inlet 12 and in supply chamber 24, and that supply fluid fills central passageway 36 and also occupies control chamber 26 whereby the pressure of the fluid in chamber 26 bears against the outer surface of sleeve 44 to urge sleeve 44 against extension 38. O-rings or other sealing elements, as shown, are employed to prevent leakage past pistons 20 and 22, boss 28 and sliding plunger 32.

A force unbalance on spool valve 16 keeps it in the position shown in FIG. 1. This force unbalance results from an area differential because plunger 32 is integral with extension 38. Thus, the liquid acts on a larger area at the left side of piston 20 than on the right side of piston 22, whereby a net rightward force is generated.

When it is desired to actuate the flush valve, handle 34 is depressed, whereby sliding plunger 32 is moved to the left. Since plunger 32 is in integral with projection 38, the leftward movement of plunger 32 drives spool valves 16 to the left. On the leftward movement of spool valve element 16, primary piston 20 moves entirely into chamber 24, whereby fluid communication is established between supply chamber 24 and outlet 14. Fluid thus flows from inlet 12 through supply chamber 24 and thence to the hollow interior 18 of the valve housing and then to outlet 14. The flushing or other supply action to be effected by the delivery of the fluid is thus accomplished.

The leftward movement of spool valve element 16 upon depression of handle 34 also results in a leftward movement of secondary piston 22 whereby the volume of control chamber 26 is substantially enlarged. This enlargement of control chamber 26 results in a substantial reduction in the pressure in chamber 26. At the same time, the fluid is forced through central passage 36 from chamber 24 to be delivered to annular groove 42. The pressure of the fluid in annular groove 42 acting on the inside of sleeve 44 is greater than the pressure on the outside of sleeve 44 at this stage of operation, and hence sleeve 44 flexes, i.e. is expanded relative to the outer surface of extension 38, and fluid under pressure flows into chamber 26 via central passageway 36, orifices 40, and annular groove 42. The fluid flows into control chamber 26 to fill the chamber, while spool valve element is moving to the left, and the fluid pressures across sleeve 44 equalize when the leftward movement of the spool valve element is terminated, whereby the sleeve returns to its original unflexed state to in essence close off flow through orifices 40. Upon removal of the leftward actuating force, the rightward load on the spool valve, which is the result of area differentials as discussed above, moves the spool valve to the right and encounters the resistance of the fluid in control chamber 26. The continued rightward force on spool valve 16 results in the fluid in chamber 26 being bled through bleed orifice 46 back into groove 42 and orifices 40 to central passage 36. The rate of this liquid bleed is controlled by the size of bleed orifice 46, and hence the fluid in control chamber 26 will be bled through bleed orifice 46 until the valve is moved to the right to reassume the original position shown in FIG. 1. There is thus established a controlled rate of bleeding of the liquid from chamber 26 so as to permit a controlled closing of the valve. When spool valve element 16 returns to the FIG. 1 position, fluid communication is again blocked off between inlet 12 and outlet 14, and the valve is ready for another cycle of operation.

Figure 3:
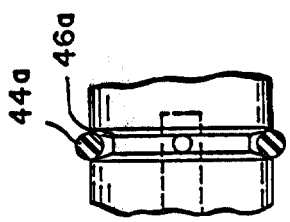
FIG. 3 is a showing of a modification of a detail of the valve of FIG. 1.

Referring to FIG. 3, a modification of the flexible sleeve is shown. In this configuration, sleeve 44 is replaced with a flexible O ring 44a which is slightly stretched so as to be preloaded to seat against inclined sides of groove 42. When the valve is actuated, fluid pressure in passage 36, orifice 40 and groove 42 will expand O ring 44a to permit the fluid to pass into control chamber 26 (just as sleeve 44 expands in the FIG. 1 embodiment). O ring 44a will return to its normal preloaded position when the fluid pressure across it equalizes. A groove 46a, shown in the side wall of groove 42 (but which also may be formed in O ring 44a) connects chamber 26 with the bottom of groove 42 for the controlled bleeding function which is performed by groove 46 in FIG. 1. The embodiment of FIG. 3 functions just like the FIG. 1 embodiment, with O ring 44a and groove 46a taking the place of and performing the functions of sleeve 44 and bleed orifice 46.

It is to be noted that in either the FIG. 1 or FIG. 3 embodiment the bleed orifice (46 or 46a) can be in the valve body directly connecting chamber 26 to central passageway 36.

Figure 2:
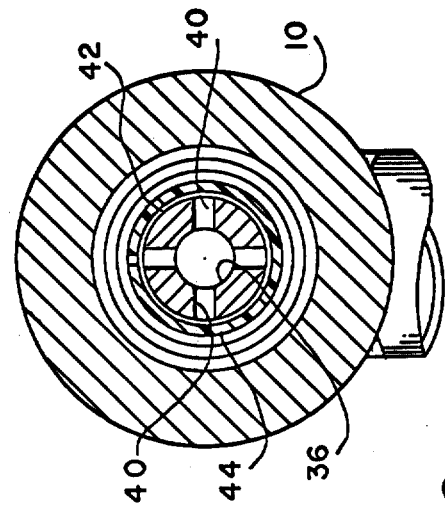
FIG. 2 is a view taken along line 2—2 of FIG. 1.
Figure 4:
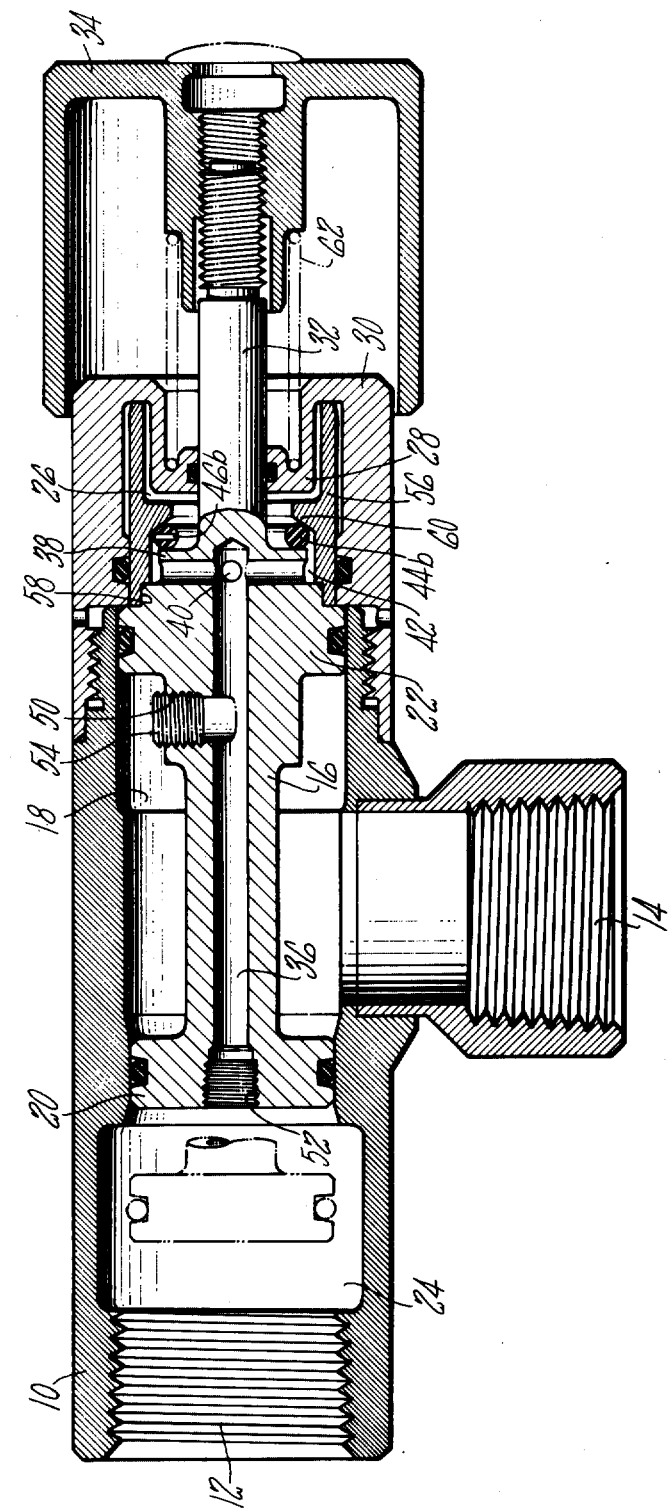
FIG. 4 is a cross-sectional elevation view of the valve of the present invention.

Referring now to FIG. 4, the modified valve of the present invention is shown. The parts of this valve which are the same or comparable to corresponding parts of the valve of FIGS. 1 and 2 are indicated with the same reference numerals as in FIGS. 1 and 2. In addition, the valve of FIG. 4 has a pair of threaded orifices 50 and 52, one of which will be closed by a threaded plug 54. Orifices 50 and 52 each communicate with central passageway 36, so that central passageway 36 is either in communication with chamber 24 and conduit 12 or chamber 18 and conduit 14. It is to be noted that conduits 12 and 14 are here being referred to as "conduits" rather than as inlet and outlet as previously identified, since the valve of FIG. 4 is reversible so that conduits 12 and 14 will be either outlets or inlets depending on the state of the valve. In the configuration shown in FIG. 4, plug 54 is mounted in orifice 50 to close off orifice 50 so that passageway 36 is in communication with chamber 24 as in FIG. 1. The FIG. 4 embodiment also has an annular sleeve 56 which is press fitted, friction fitted or otherwise secured to shoulder 58 of projection 38. An inwardly directed annular ridge 60 on collar 56 cooperates with shoulder 58 to define a flow passageway between the orifices 40 and control chamber 26. A compressible flexible O ring 44b is seated between projection 38 and ridge 60 and functions to control the flow of fluid between orifices 40 and control chamber 26. With the valve in the position shown in FIG. 4, O ring 44b is in sealing engagement with projection 38 and ridge 60. A spring 62 extends from boss 28 to a shoulder on handle 34, and spring 32 urges the valve to the right to the closed position.

As shown in FIG. 4, the valve functions essentially the same as the valve in FIG. 1. Orifice 12 is the inlet, and orifice 14 is the outlet. The pressure imbalance on pistons 20 and 22 and spring 62 combine to load the valve to the right to the closed position. The fluid from inlet 12 occupies central passage 36 and orifices 40, and the fluid is also present in annular groove 42 and in control chamber 26, with the pressure across O ring 44b being equalized because of the bleed orifice 46b in O ring 44b.

Depressing handle 34 moves spool valve 16 to the left, whereupon primary piston 20 moves into chamber 24 (as shown in the broken line configuration) to establish fluid communication between supply chamber 24 and outlet 14. This leftward movement of the spool valve also results in leftward movement of secondary piston 22 whereby the volume of control chamber 26 is substantially enlarged, thus resulting in a substantial reduction in the pressure in chamber 26. The pressure in annular groove 42 is now greater than the pressure in chamber 26 on the other side of O ring 46b, and hence O ring 46b is compressed. When O ring 46b compresses, it moves away from sealing engagement between projection 38 and ridge 60 so that fluid under pressure flows into chamber 26 to fill the control chamber. When chamber 26 fills, the pressure across O ring 44b then expands to its normal position in sealing engagement between projection 38 and ridge 60.

Upon removal of the leftward actuating force on the handle, the rightward pressure differential load on the spool valve and the force of spring 62 urges the spool valve to the right and encounters the resistance of the fluid in control chamber 26. The continued rightward force on spool valve 16 results in the fluid in control chamber 26 being bled through bleed orifice 46b back into groove 42 and through orifices 40 to central passage 36. The rate of this liquid bleed is controlled by the size of the orifice 46b, and hence the fluid in control chamber 26 will be bled through bleed orifice 46b until the valve is moved to the right to reassume the original position shown in FIG. 4. The valve closes at a controlled rate, determined by bleed 46b, until the spool valve element 16 returns to the full line position shown in FIG. 4, and the valve is then ready for another cycle of operation.

The direction of flow through the valve of FIG. 4 can be reversed so that orifice 14 will be the inlet and orifice 12 will be the outlet. This reversal of direction of flow through the valve is accomplished merely by removing plug 54 from orifice 50 and mounting it in orifice 52. This switch in the location of plug 54 establishes flow communication between chamber 18 and central passageway 36, and closes off communication between passage 36 and chamber 24. In this configuration, and with conduit 14 connected to a fluid supply, the fluid in inlet 14 fills chamber 18. Depending on the size of pistons 22 and 20 and the pressurized areas which are exposed to the fluid in chamber 26, there may be a net rightward force imbalance urging the valve to the closed position as shown in FIG. 4. However, the principal rightward closing force is derived from spring 62 when the valve of FIG. 4 is connected for reverse flow. The fluid at inlet 14 fills chamber 18 and is delivered to passage 36 through the now open orifice 50. In the same manner as discussed above, the fluid also fills control chamber 26 with the pressure across O ring 44b being equalized.

Upon depressing handle 34, primary piston 20 is moved to the left into chamber 24 so that fluid flows from inlet 14 to outlet 12. In the same manner as discussed above, control chamber 26 is substantially enlarged so that a pressure differential occurs across O ring 44b. This pressure differential results in a compression of O ring 44b so that the O ring separates from its sealing engagement between projection 38 and ridge 60, whereby the flow of fluid into control chamber 26 is increased to rapidly fill chamber 26.

When the leftward actuating force is removed from handle 34, spring 62 and any rightward force imbalance which may be present will urge spool valve 16 to the right, whereupon the resistance of the fluid in control chamber 26 is encountered. The continued rightward force on spool valve 16, which is now primarily from spring 62, results in the fluid in control chamber 26 being bled back through bleed orifice 46b in the same manner as previously discussed until the valve returns to its closed position. Thus, even with the reversal of flow direction through the valve, there is established a controlled rate of bleeding of the liquid from chamber 26 to achieve a controlled closing of the valve. When spool valve 16 returns to the full line position of FIG. 4, the valve is again ready for another cycle of operation in the direction of reverse flow. Of course, the reversing feature of the valve of FIG. 4 can also be incorporated in the valve of FIG. 1.

From the foregoing description, it can be seen that the valve of this invention is manually operated, is self-closing, at a controlled rate, and is reversible. Furthermore, the valve element and the actuating element move only in a linear direction along the same axis.

While a preferred embodiment has been shown and described, various modifications and substitutions can be made thereto without departing from the spirit and scope of the invention. Accordingly, it is to be understood that the present invention has been described by way of illustration and not limitation.

What is claimed is:

1. A fluid valve including:
   a valve body having a fluid inlet and a fluid outlet;
   valve means in said valve body, said valve means being movable between a first position in which said fluid inlet is sealed from said fluid outlet and a second position in which said fluid inlet is in fluid communication with said fluid outlet;
   control chamber means in said valve body for containing fluid to control the rate of movement of said valve means from said second position to said first position, said control chamber being defined in part by said valve means;
   projection means extending from said valve means to said control chamber means;
   sleeve means extending from said valve means into said control chamber means;
   passage means in said valve means for delivering fluid from said inlet to said control chamber, said passage means including orifice means in said projection means;

compressible ring means for controlling fluid flow from said passage means into said control chamber means, said compressible ring means being located between said projection means and said sleeve means and being exposed on one side thereof to fluid pressure in said passage means and said ring means being exposed on the other side thereof to pressure in said control chamber said compressible ring means being compressed by a pressure differential thereacross to admit fluid from said passage means to said control means when said valve means is moved from said first position to said second position;

bleed means between said control chamber means and said passage means to bleed fluid from said control chamber means to said passage means; and actuator means for actuating said valve means from said first position to said second position.

2. A fluid valve as in claim 1 including:
a pair of spaced apart piston means on said valve means, said piston means having differential area whereby a fluid pressure generated force on said piston means urges said valve means toward said first position.

3. A fluid valve as in claim 1 including:
spring means urging said valve means toward said first position.

4. A fluid valve as in claim 1 wherein:
said bleed means includes bleed orifice means through said resilient means.

5. A fluid valve including:
a valve body having a first fluid conduit and a second fluid conduit;
valve means in said valve body, said valve means being movable between a first position in which said first fluid conduit is sealed from said second fluid conduit and a second position in which said first fluid conduit is in fluid communication with said second fluid conduit;
control chamber means in said valve body for containing fluid to control the rate of movement of said valve means from said second position to said first position, said control chamber being defined in part by said valve means;
passage means in said valve means for delivering fluid from one of said first and second fluid conduits to said control chamber;
resilient means on said valve means for controlling fluid flow from said passage means into said control chamber means;

bleed means between said control chamber means and said passage means and to bleed fluid from said control chamber means to said passage means;
actuator means for actuating said valve means from said first position to said second position;
means urging said valve means toward said first position; and
plug means in a first position establishing fluid communication between said first conduit and said passage means and blocking fluid communication between said second conduit and said passage means whereby the direction of fluid flow through said valve will be in a first direction from said first conduit to said second conduit, and said plug means in a second position establishing fluid communication between said second conduit and said passage means and blocking fluid communication between said first conduit and said passage means to reverse the direction of fluid flow through said valve from said second conduit to said first conduit.

6. A fluid valve as in claim 5 including:
projection means extending from said valve means into said control chamber means;
said passage means including orifice means through said projection means; and
said resilient means including a flexible member cooperating with said projection means, said flexible member being exposed on one side thereof to fluid pressures in said passage means and being exposed on the other side thereof to pressure in said control chamber.

7. A fluid valve as in claim 6 wherein:
said bleed means includes bleed orifice means through said flexible member communicating with said orifice means through said projection means.

8. A fluid valve as in claim 5 including:
projection means extending from said valve means into said control chamber means;
said passage means including orifice means through said projection means;
sleeve means extending from said valve means into said control chamber means; and
said resilient means including compressible ring means between said projection means and said sleeve means, said ring means being exposed on one side thereof to fluid pressures in said passage means and being exposed on the other side thereof to pressure in said control chamber.

9. A fluid valve as in claim 8 wherein:
said bleed means includes bleed orifice means through said compressible ring means.

* * * * *